Figure 1:
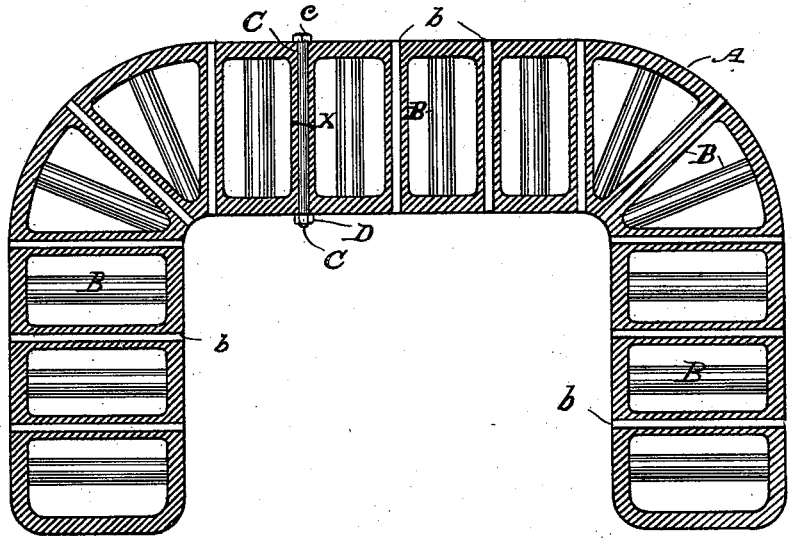

(No Model.)

C. H. HUTCHINSON.
FEED WATER HEATER.

No. 574,483. Patented Jan. 5, 1897.

Witnesses
Inventor
Charles H. Hutchinson
By his Attorney

UNITED STATES PATENT OFFICE.

CHARLES H. HUTCHINSON, OF MANCHESTER, NEW HAMPSHIRE.

FEED-WATER HEATER.

SPECIFICATION forming part of Letters Patent No. 574,483, dated January 5, 1897.

Application filed December 2, 1895. Serial No. 570,775. (No model.)

*To all whom it may concern:*

Be it known that I, CHARLES H. HUTCHINSON, a citizen of the United States, residing at Manchester, in the county of Hillsborough and State of New Hampshire, have invented certain new and useful Improvements in Feed-Water Heaters; and I do hereby declare the following to be a full, clear, and exact description of the invention, such as will enable others skilled in the art to which it appertains to make and use the same.

This invention relates to means for repairing fractures in feed-water heaters, the object being to lessen the danger resulting from such causes and to simplify and decrease the cost for repairs.

Where the feed-water is heated by passing through cast-iron furnace-mouth protectors, much danger is incurred, as the steam-pressure is quite often as great in such a heater as in the boiler, and the former, if made of cast-iron, is not adapted to carry it.

Stays or stay-bolts are sometimes provided to guard against such troubles, but to provide these before a fracture appears greatly increases the cost of manufacture. This being the case, I have turned my attention to devising means for readily discovering a fracture in a cast-iron feed-water heater and repairing and strengthening the same as they occur, thus avoiding the necessity of a more expensive construction on the start. This I accomplish by the use of hollow stays, which are provided in such numbers as may be desired or required, the thickness of the stays being such as to cause any strain or fracture to occur in a stay instead of the shell of the heater, which may be easily discovered by leakage and repaired by placing a rivet or bolt through the fractured stay and closing the gap by heading the rivet or by tightening a threaded nut on one end of the bolt, as fully set forth in the following specification and claims and clearly shown in the drawings accompanying and forming a part of the same, of which—

Figure 2:
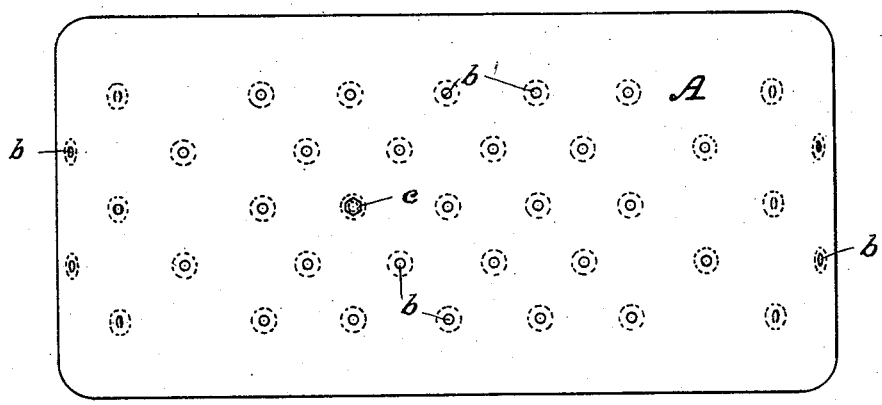

Figure 1 is a cross-section of my improved feed-water heater, and Fig. 2 is a plan view of the same.

The heater is composed of a shell A, through which I place a series of hollow stays B, formed by suitable cores, the central perforation of which is shown at $b$.

In Fig. 1 is shown a fracture X in one of these hollow stays, through the perforation of which is shown a bolt C, having at one end a head $c$ and at the other a threaded nut D, and it is obvious that the leak may be quickly and tightly closed by turning the nut or, in case a rivet is substituted for the bolt, by heading the projecting end of the same.

Having described my improvements, what I claim is—

1. A feed-water heater formed integral and comprising a shell having a series of hollow stays the walls of which are weaker than the shell proper.

2. A feed-water heater formed integral and comprising a shell having a series of hollow stays the walls of which are weaker than the shell proper and means for closing said stays when fractured.

In testimony whereof I affix my signature in presence of two witnesses.

CHARLES H. HUTCHINSON.

Witnesses:
   J. B. THURSTON,
   GEO. H. WARREN.